(12) United States Patent
Whelan

(10) Patent No.: US 7,567,218 B2
(45) Date of Patent: Jul. 28, 2009

(54) DISH ASSEMBLY

(76) Inventor: Robert Edgar Whelan, 16 Carslake Loop, Gordon, ACT 2906 (AU)

( * ) Notice: Subject to any disclaimer, the term of this patent is extended or adjusted under 35 U.S.C. 154(b) by 598 days.

(21) Appl. No.: 10/523,289

(22) PCT Filed: Jul. 30, 2003

(86) PCT No.: PCT/AU03/00964

§ 371 (c)(1),
(2), (4) Date: Sep. 6, 2005

(87) PCT Pub. No.: WO2004/013547

PCT Pub. Date: Feb. 12, 2004

(65) Prior Publication Data

US 2006/0124123 A1    Jun. 15, 2006

(30) Foreign Application Priority Data

Aug. 5, 2002    (AU) ............................... 2002950582

(51) Int. Cl.
*H01Q 15/14* (2006.01)
(52) U.S. Cl. .................. 343/912; 343/915; 343/907
(58) Field of Classification Search ................ 342/912; 343/907, 912, 915; 126/600, 696
See application file for complete search history.

(56) References Cited

U.S. PATENT DOCUMENTS

| 4,010,614 A | 3/1977 | Arthur |
| 4,161,942 A | 7/1979 | Monk |
| 4,373,783 A | 2/1983 | Anderson |
| 4,390,009 A | 6/1983 | Consilvio |
| 4,568,945 A | 2/1986 | Winegard |
| 5,104,211 A * | 4/1992 | Schumacher et al. ........ 359/853 |
| 5,964,216 A | 10/1999 | Hoffschmidt |

FOREIGN PATENT DOCUMENTS

| CH | 625629 | 9/1981 |
| FR | 1156873 | 5/1958 |
| FR | 2403526 | 4/1979 |
| FR | 2579374 | 9/1986 |
| JP | 10 311609 | 11/1998 |

* cited by examiner

*Primary Examiner*—Trinh V Dinh
*Assistant Examiner*—Dieu Hien T Duong
(74) *Attorney, Agent, or Firm*—Daniel L. Dawes; Marcus C. Dawes

(57) ABSTRACT

A dish assembly is disclosed which has a central hub, an outer rim member, and a plurality of concentric arcuate structural members comprising at least an inner and an outer arcuate structural members extending from the central hub to the outer rim member, each of the arcuate structural members having an upper channel member, a lower channel member, an inner arcuate surface and an outer arcuate surface which cooperate to constitute a box section configuration and wherein said each upper and lower channel member comprises a channel base and a pair of channel flanges, and the inner and outer arcuate surfaces of each of the arcuate structural members are abutted such that a gravitational or wind load is transferred from the outer arcuate structural member to the adjoining inner arcuate structural member via a fin disposed on the inner arcuate surface of each of the arcuate structural members.

10 Claims, 14 Drawing Sheets

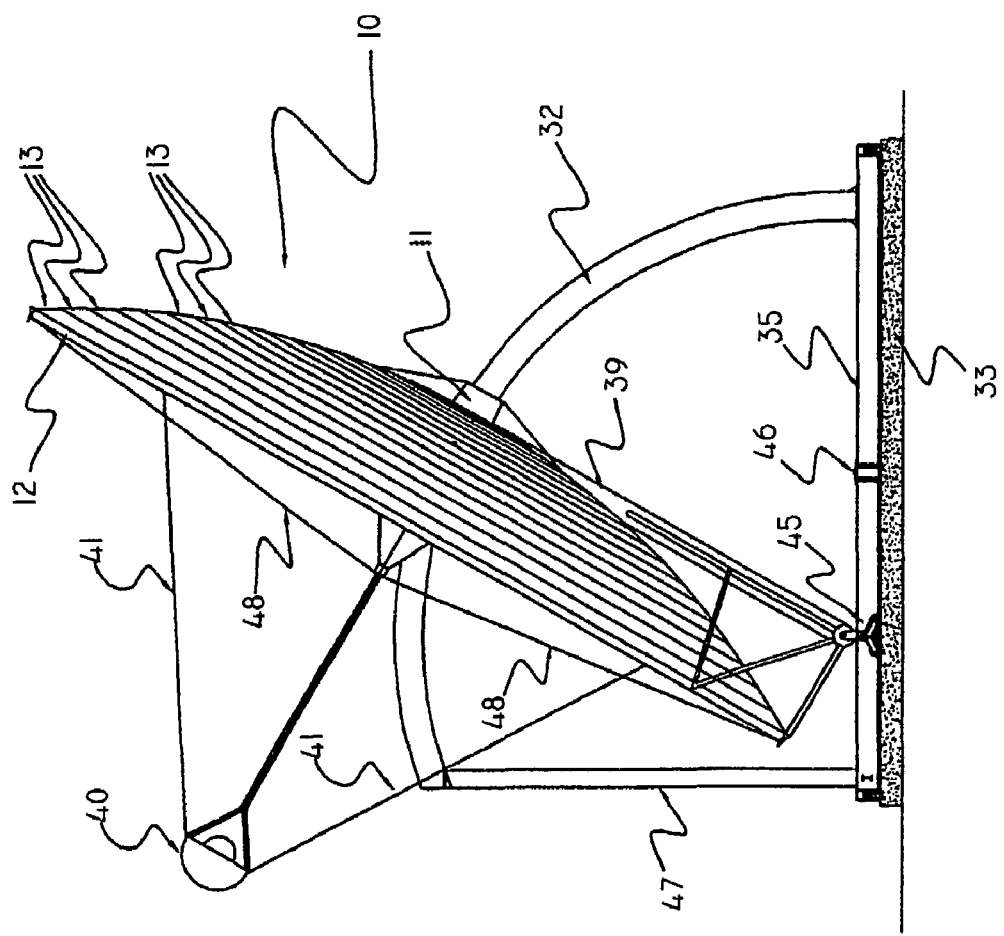

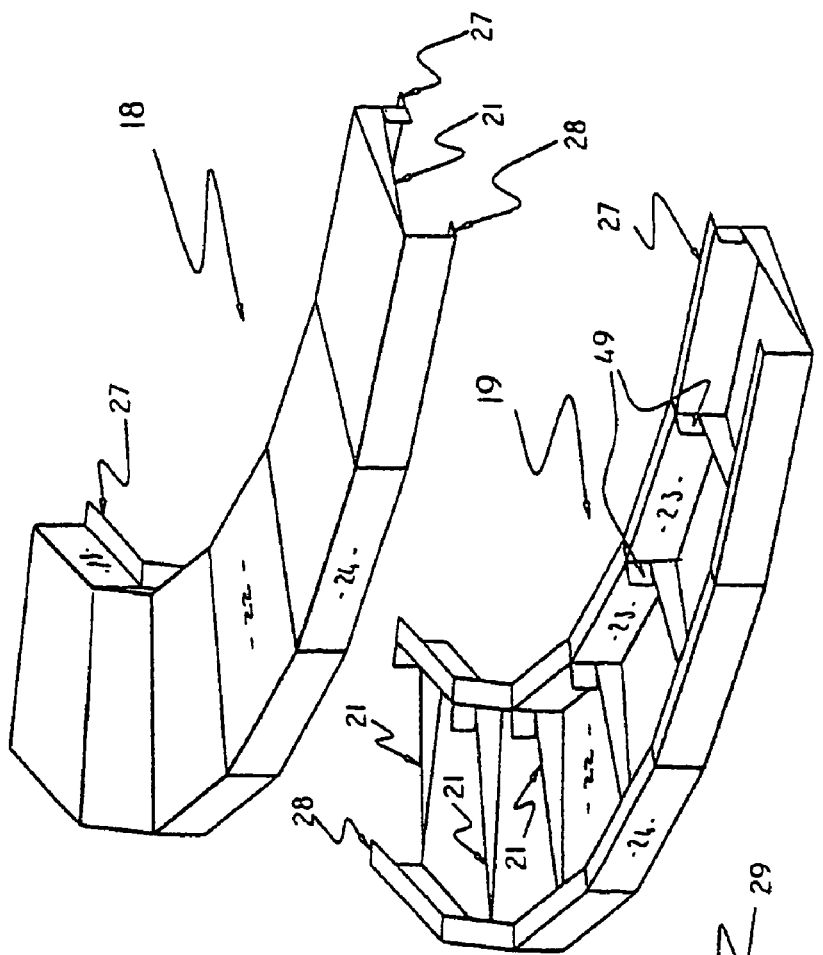
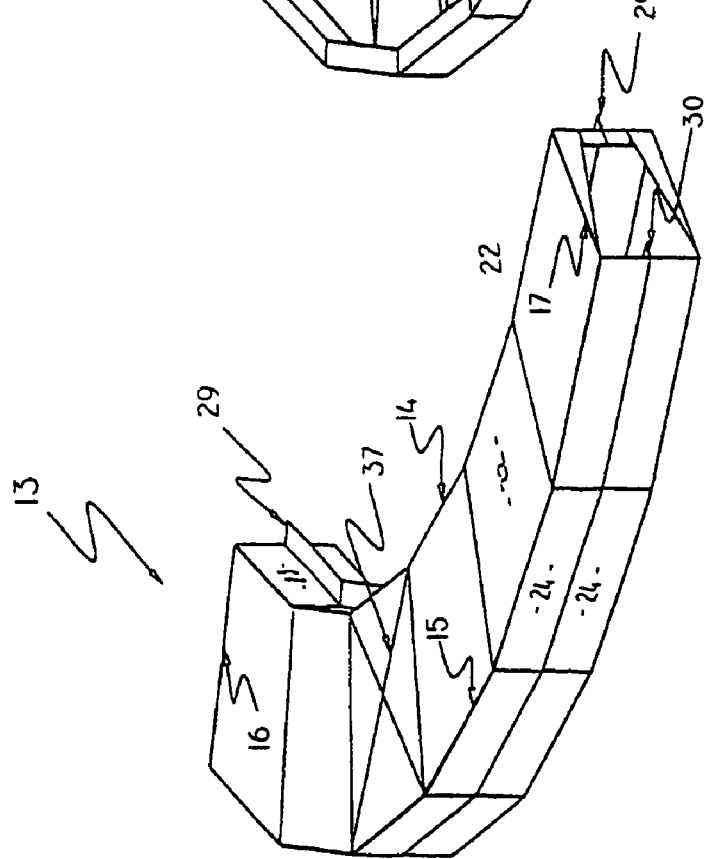

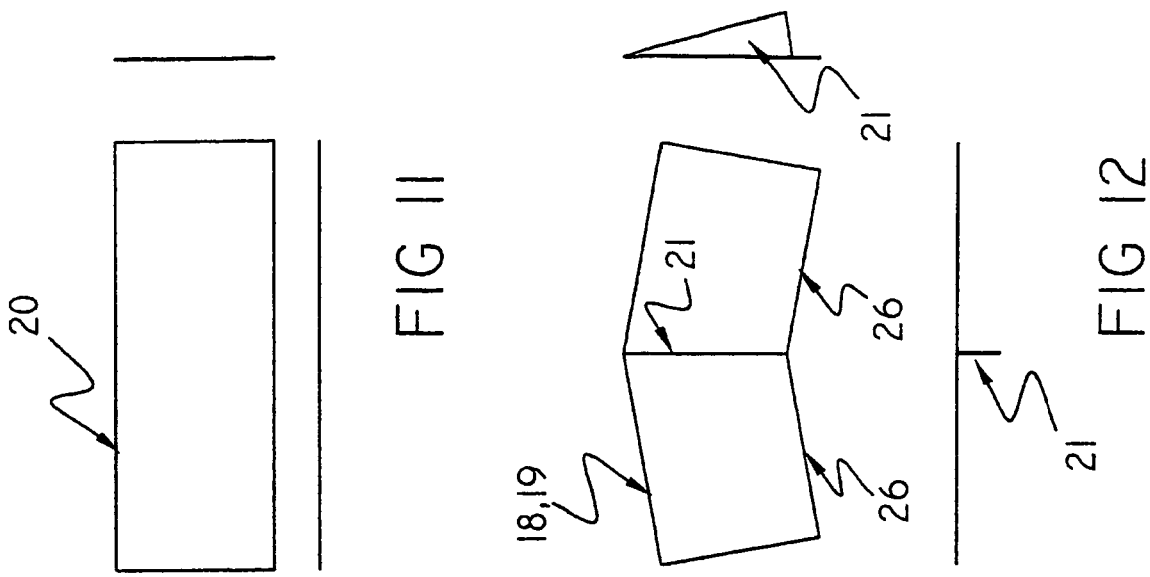
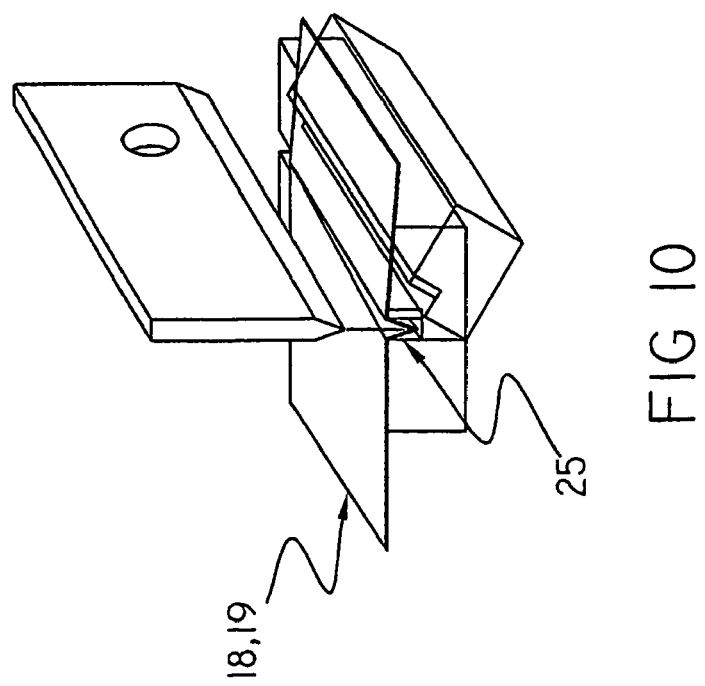

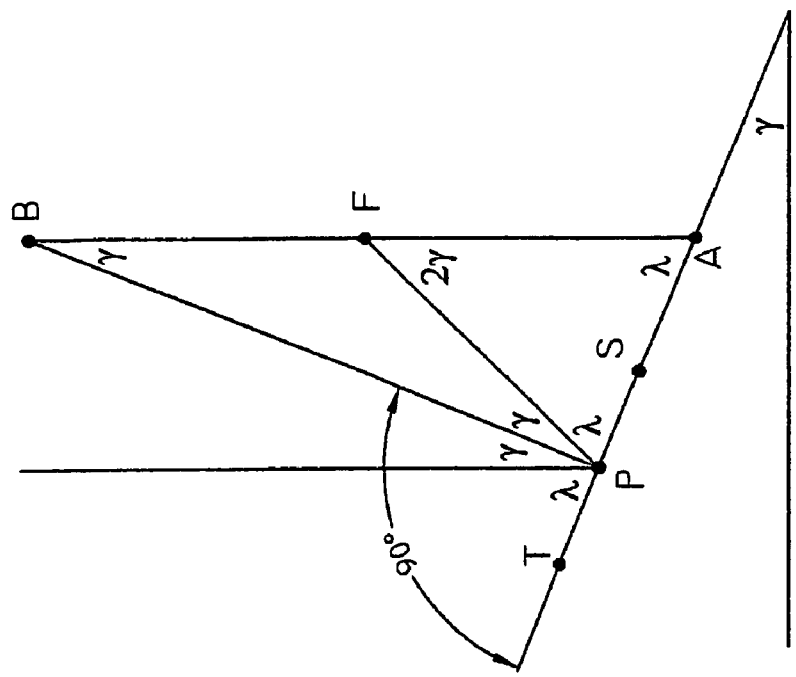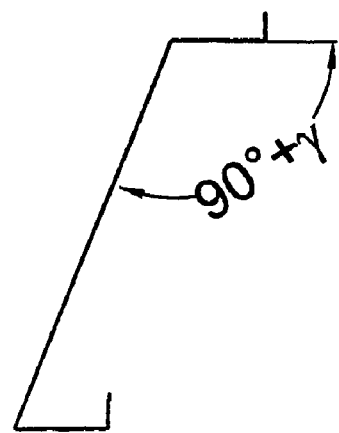
FIG 14

AZIMUTH DRIVE FOR 540° ROTATION.

DUAL RAM AZIMUTH DRIVE

DISH ASSEMBLY

This application is a 371 of PCT/AU03/00964 Jul. 30, 2003.

TECHNICAL FIELD

This invention relates to a dish assembly.

As used herein the expression dish assembly refers to any dislike structure the surface of which is curved such as by way of example, in a paraboloid or conic surface.

The invention has particular but not exclusive application to dish assemblies which collect solar radiation and in this specification the invention will be described by reference to its application to solar collectors. However it will be appreciated that the dish assembly of the present invention may be utilised in other applications utilising dish assemblies such as for example, dish antennas for radio telescopes and satellite or other wireless communication.

BACKGROUND OF INVENTION

Dish assemblies for collecting and concentrating solar radiation are known which concentrate direct solar radiation in excess of 1000 times by the reflection of incoming direct or beam radiation. These systems automatically track the sun with a total error of less than 0.1 sun diameters and provide a reduced aerodynamic profile to survive in high winds. They maintain the position of a receiver or a receiver-converter to the focus of the concentrated radiation to better than 0.1 sun diameters, and attempt to achieve minimum costs for manufacture, installation and maintenance. The known assemblies have aperture or collecting areas usually between 100 and 150 sq. metres although a few assemblies exceed 250 sq. metres.

SUMMARY OF INVENTION

The present invention aims to provide an alternative to known dish assemblies.

This invention in one aspect resides broadly in a dish assembly including:— a central hub;

an outer rim member, and a plurality of concentric arcuate structural members extending from the central hub to the outer rim member;

the arcuate structural members being of box-section configuration and abutting along their inner and outer arcuate surfaces such that load can be transferred from an outer arcuate structural member to an inner arcuate structural member.

As used herein the expression "box-section configuration" refers to a structural member having at least three sides of which all or all except one, are wall members, the one excepted side if not a wall member being braced to maintain the box-section configuration when the arcuate structural member is under load.

As used herein the expression wall member is to be given a broad meaning and refers to any substantially planar substantially rigid sheet-like material. The expression covers material which is not necessarily continuous such as sheet metal having cut-out portions.

The arcuate structural members may constitute annular rings. However it is preferred that the arcuate structural members constitutes arcs of finite length and that the dish assembly includes a plurality of radial support arms extending from the central hub to the outer rim member and adapted to support the ends of the arcuate structural members.

It is also preferred that the arcuate structural members have an upper and lower channel member which cooperate to constitute the box-section configuration.

It is also preferred that the upper and lower channel members are formed from substantially rectangular metal sheeting.

It is also preferred that the gauge of the metal sheeting from which the arcuate structural members are made is greater in an inner arcuate structural member than in an outer arcuate structural member.

It is also preferred that the upper and lower channel members have a transverse rib formed within the channel across the channel base between the channel flanges, the rib being formed from the base.

It is also preferred that the rib is formed by folding inwardly a portion of the base, the fold being deeper at one flange than the other such that the rib is correspondingly deeper at one flange than the other, whereby the rib constitutes a cantilever and whereby the edges of the substantially rectangular sheet becomes angled about the rib to thereby form the arc in the arcuate member.

It is also preferred that the flanges of the upper and lower channel members have outwardly and inwardly directed returns at the respective toes thereof, such that when the upper and lower channel members cooperate to constitute the arcuate structural member of box-section configuration, the returns constitute cooperating keys and recesses respectively of adjoining concentric arcuate structural members whereby load can be transferred from an outer arcuate structural member to an adjoining inner arcuate structural member.

It is also preferred that the dish assembly includes a plurality of mirrors affixed to the bases of the upper channel members whereby the dish assembly constitutes a solar collector.

It is also preferred that the mirrors are substantially square with sides substantially the width of the arcuate structural members.

It is also preferred that the dish assembly includes a dish support member supportable on a foundation and receivable within an opening in the hub member and adapted to cooperate therewith to elevate the dish assembly with respect to the foundation.

In another aspect this invention resides broadly in a dish assembly including:— a central hub having a central opening therein, and and a dish support member supportable on a foundation and receivable within the central opening of the hub member and adapted to cooperate with the hub member whereby the dish assembly is elevated with respect to the foundation.

It is preferred that the dish support member is an arcuate beam along which the hub member travels whereby the dish can be positioned between a first position where it rests substantially on the ground with its axis substantially vertical and a second position where it is supported on the dish support member with its axis substantially horizontal.

It is also preferred that the dish support member is mounted on a rotatable platform such that the azimuthal positioning of the dish can be varied.

In another aspect this invention resides broadly in a method of erecting a dish assembly at a remote location, the dish assembly having a central hub and an outer rim member, the method including:— transporting to the remote location a plurality of flat stacked substantially rectangular metal sheets or nested sections formed therefrom;

at the remote location forming a plurality of arcuate structural members of box-section configuration from the substantially rectangular metal sheets or from the sections formed therefrom, and positioning the plurality of arcuate structural members to extend concentrically from the central hub to the outer rim member, the arcuate structural members abutting along their inner and outer arcuate surfaces such that load can be transferred from an outer arcuate structural member to an adjoining inner arcuate structural member.

It is preferred that the method also includes:— positioning a plurality of radial support arms extending from the central hub to the outer rim member, and supporting the arcuate structural members on the radial support arms.

It is also preferred that the method includes:— forming the substantially rectangular metal sheets or the sections formed therefrom into upper and lower channel members, and joining the upper and lower channel members to form the arcuate structural members.

It is also preferred that the method includes forming within the channel and from the channel base a transverse rib across the channel base between the channel flanges.

It is also preferred that the method includes folding inwardly a portion of the base, the fold being deeper at one flange than the other such that the rib formed thereby is correspondingly deeper at one flange than the other, whereby the rib constitutes a cantilever and whereby the edges of the substantially rectangular sheet becomes angled about the rib to thereby form the arc in the arcuate member.

It is also preferred that the method includes:— mounting a dish support member on a foundation, and supporting the dish assembly on the dish support member via an opening in the hub member which is adapted to cooperate with the dish support member to elevate the dish assembly with respect to the foundation.

In another aspect this invention resides broadly in a method of elevating a dish assembly above a foundation, the method including:— providing an opening in a central portion of the dish assembly;

mounting a dish support member on the foundation;

supporting the dish assembly on the dish support member within the opening, and causing the dish assembly to travel along the dish support member.

DESCRIPTION OF DRAWINGS

In order that this invention may be more easily understood and put into practical effect, reference will now be made to the accompanying drawings which illustrate a preferred embodiment of the invention, wherein:—

FIG. 1 is a side elevation of the dish assembly of the present invention shown at an elevation of 60 degrees;

FIG. 7 is a perspective view showing an arcuate structural member;

FIGS. 9A AND 9B are perspective views of the upper and lower channel members respectively after formation of ribs and which when assembled form the box-sectioned configuration of FIG. 7;

FIG. 10 is a perspective view illustrating the operation of a tool to form the ribs, and FIGS. 11 and 12 are orthographic projections which respectively illustrate a substantially rectangular metal sheet before and after the formation of the ribs;

FIGS. 13A and 13C show the operation of the tool which forms the ribs thereby changing the cross-sectional profile of the upper or lower channel members from that seen in FIG. 13B, which corresponds to the tool being in the position shown in FIG. 13A, to that seen in FIG. 13D which corresponds to the tool being in the position shown in FIG. 13C;

FIG. 14 illustrates the derivation of the bend angle resulting from the channel and rib-forming operation;

DESCRIPTION OF PREFERRED EMBODIMENT OF INVENTION

Figure 3:
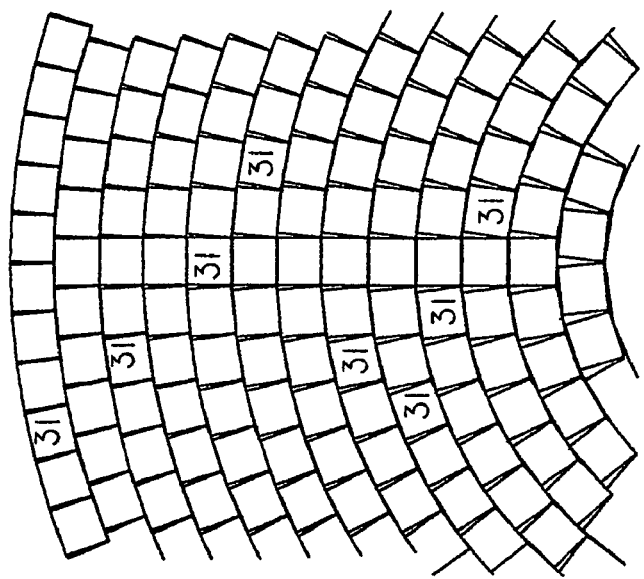
FIG. 3 is an enlargement of a portion of FIG. 2 showing the mirrors in greater detail.

As can be seen throughout the drawings, in a preferred embodiment the present invention provides a dish assembly 10 having a central hub 11, an outer rim member 12, and a plurality of concentric arcuate structural members 13 extending from central hub 11 to outer rim member 12 (see FIG. 1). The arcuate structural members 13 are of box-section configuration (see FIG. 7) and abut along their inner and outer arcuate surfaces 14,15 respectively such that load can be transferred from an outer arcuate structural member to an inner arcuate structural member.

Figure 2:
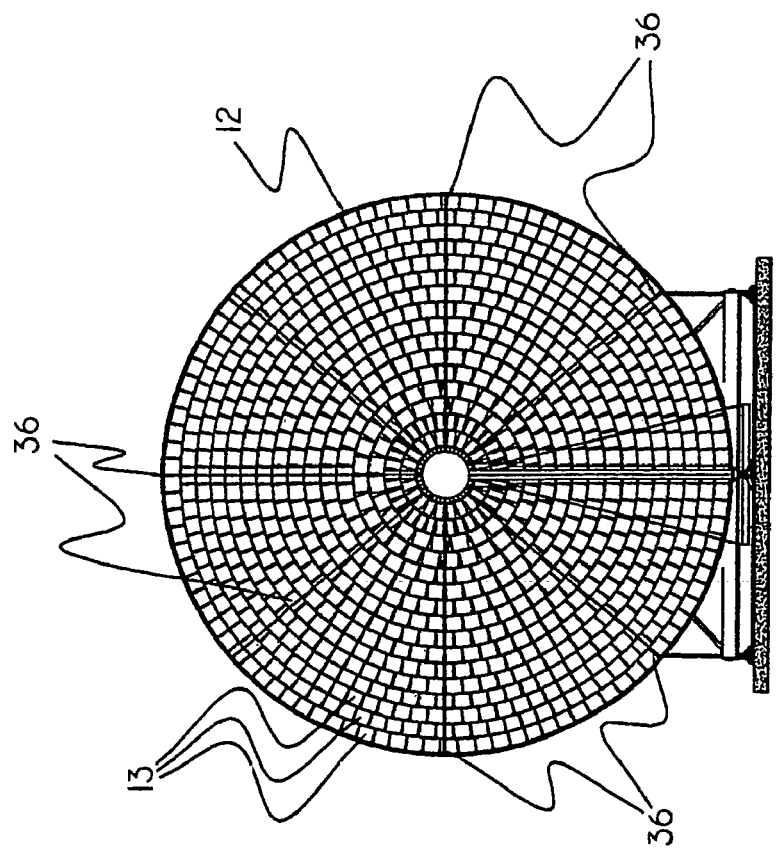
FIG. 2 is a front-on view of the dish assembly shown fully elevated and illustrating the concentric bands of mirrors positioned on the concentric arcuate structural members and showing the hub, radial supports and outer rim.

The arcuate structural members 13 constitute arcs of finite length and dish assembly 10 has a plurality of radial support arms 36 (see FIG. 2) extending from central hub 11 to outer rim member 12. The radial support arms 36 support the ends 16,17 (see FIG. 7) of arcuate structural members 13.

Figure 8:
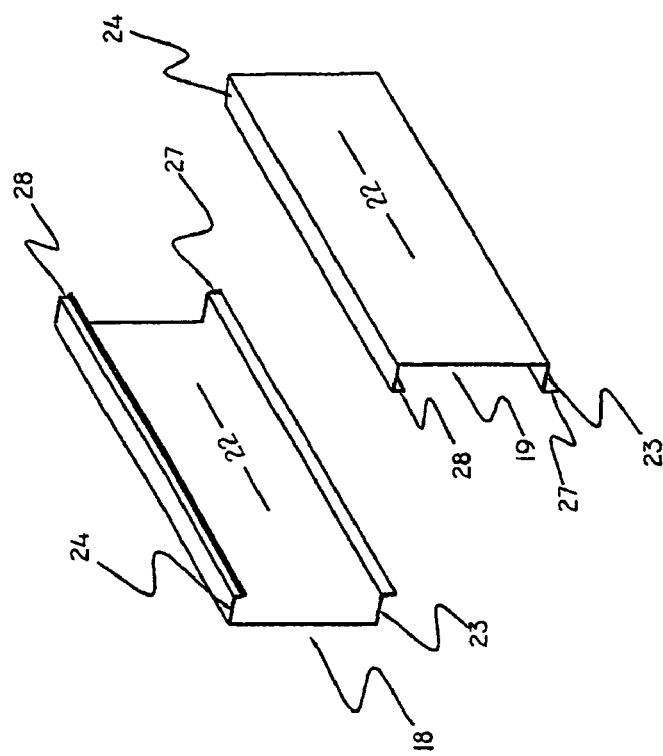
FIG. 8 is a perspective view of the upper and lower channel members respectively prior to the formation of ribs to bend the channels to an arcuate form.

Arcuate structural members 13 have an upper and lower channel member 18,19 (see FIGS. 7 to 9) which cooperate to provide the box-section configuration. As seen in FIGS. 10 to 13, upper and lower channel members 18,19 are formed from substantially rectangular metal sheeting 20. Upper and lower channel members 18,19 have transverse ribs 21 formed within the channel across the channel base 22 between the channel flanges 23,24.

The ribs 21 are formed from the material of channel base 22 (see FIGS. 7, 8, 9A, 9B, 10 and 12) by folding inwardly a portion of channel base 22 with the fold 25 being deeper at one flange 23 than at the other flange 24 such that rib 21 is correspondingly deeper at one flange 23 than the other 24 (see FIGS. 9A and 9B). Each rib 21 thus constitutes a cantilever. Furthermore because of the sacrificial formation of the ribs 21 from the base material 22 the edges of the substantially rectangular sheet 20 is angled about the rib 21 to thereby form the arc in the arcuate member 13.

Flanges 23,24 of upper and lower channel members 18,19 have outwardly and inwardly directed returns 27,28 at the respective toes of the flanges (see FIGS. 7, 8 9A and 9B). Accordingly, when upper and lower channel members 18,19 cooperate to constitute the arcuate structural member 13 having box-section configuration, the returns 27,28 constitute cooperating keys 29 and recesses 30 (see FIG. 7) respectively of adjoining concentric arcuate structural members 13 whereby load can be transferred from an outer arcuate structural member to an adjoining inner arcuate structural member.

As can be seen in FIG. 3, the dish assembly has a plurality of mirrors 31 affixed to the channel bases 22 of the upper channel members 18 whereby the dish assembly constitutes a solar collector. Minors 31 are substantially square with sides substantially the width of the arcuate structural members.

To allow the dish assembly to be elevated, a dish support member 32 which is mounted on rotatable platform 35 which is supported on a foundation 33 (see FIG. 1). Dish support member 32 is received through an opening in hub 11 and the two cooperate to elevate the dish assembly 10 with respect to foundation 33.

Figure 4:
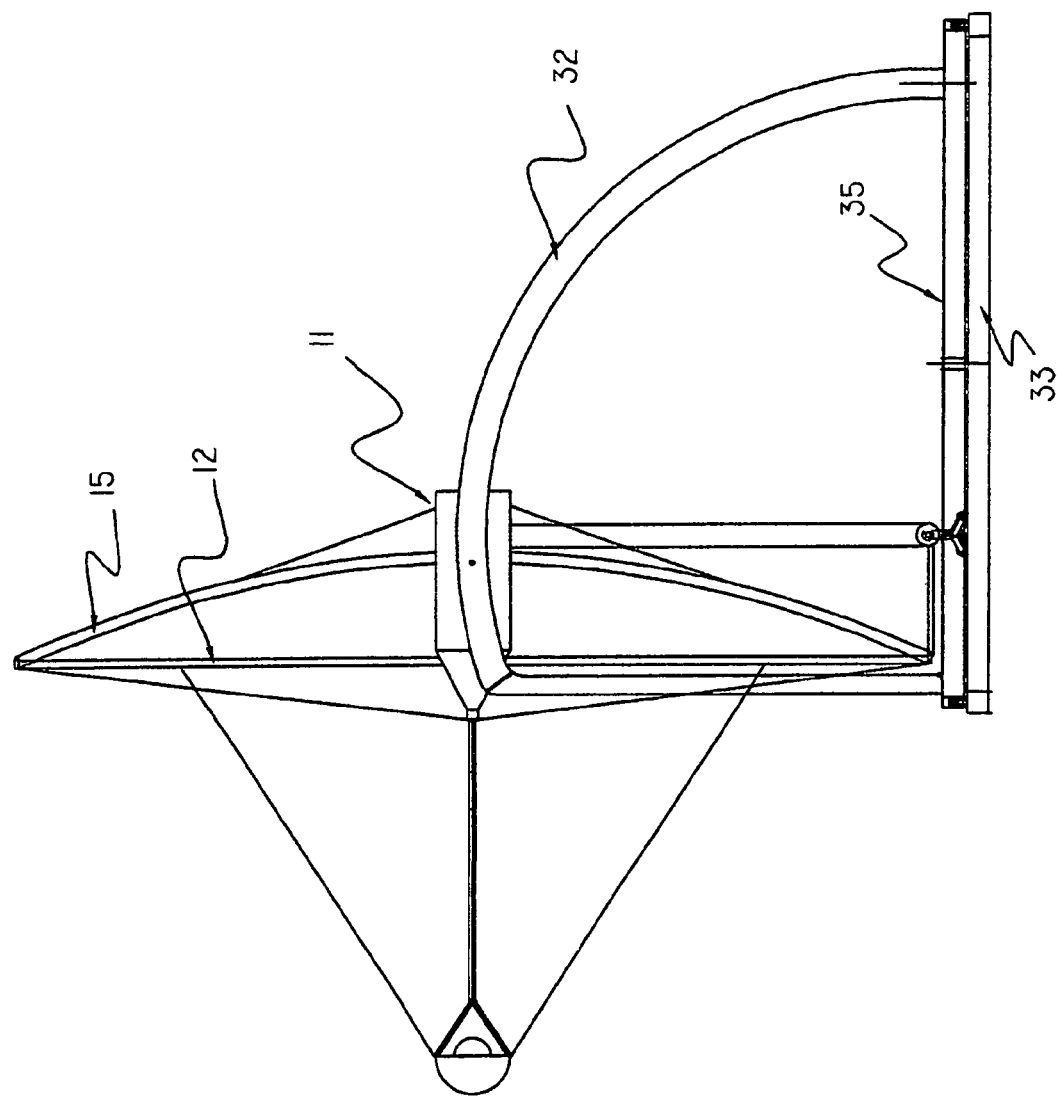
FIG. 4 is a sectional elevation of the dish assembly shown fully elevated.
Figure 5:
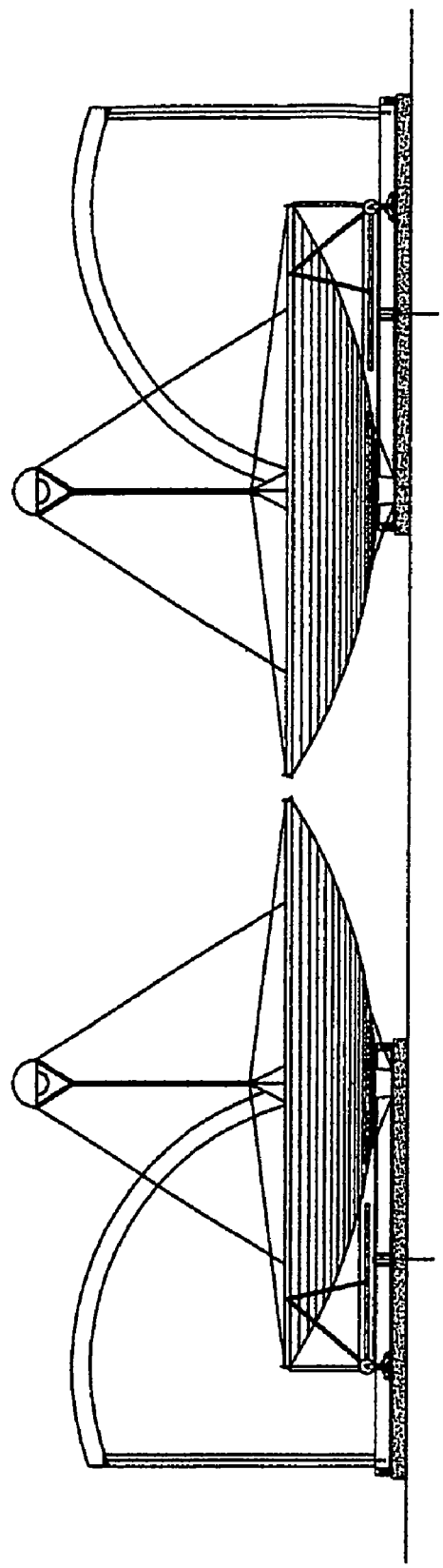
FIG. 5 is a side view showing two dish assemblies in a stowed position adjacent the dish foundation.

It will also be appreciated that in another preferred embodiment the present invention constitutes a dish assembly 10 having a central hub 11 with a central opening therein, and a dish support member 32 which is supported on a foundation 33 and is received within the central opening of hub member 11 and cooperates with hub member 11 to elevate dish assembly 10 with respect to foundation 33. Dish support member 32 is an arcuate beam along which the hub member 11 travels whereby the dish 10 can be positioned at intermediate locations (as seen in FIG. 1) between a first position (as seen in FIG. 5) where it rests substantially on the ground with its axis substantially vertical and a second position (as seen in FIG. 4) where it is supported on the dish support member 32 with its axis substantially horizontal.

Dish support member 32 is mounted on a rotatable platform 35 such that the azimuth positioning of the dish can be varied.

In general terms it can be seen that the dish assembly of the present invention (hereinafter "the dish") is a large circular shell shaped structure, about 25 metres in diameter, formed by a series of nested concentric hollow box sectioned polygonal rings made up of arcuate segments 13 fitted within an outer ring 12. The polygonal rings are manufactured from sheet metal and preferably the thickness of the metal decreases with increasing diameter. The polygonal rings are divided into appropriate sectors to facilitate handling during manufacture and assembly and are joined at bracing plates (the radial supports 36) positioned on radii which connect sectors of the same polygonal ring and adjacent rings together.

The inner and outer sides 14,15 of each of the box sectioned nested polygonal rings are parallel to the common dish axis and are manufactured to include recesses 30 and projections 29 along circumferential lines through their centres. The top and bottom faces are symmetrical about radii to, and constructed to be angled to planes orthogonal to, the common axis. The top faces of the nested box sections form facets that approximate the concave surface of a paraboloid. Pressed shallow diagonal grooves 37 stiffen the bottom and top faces in conventional manner. (See FIG. 7 where one such set of grooves is shown for exemplary purposes). Where required, the bottom faces have apertures, or portions are cut out of the bottom face, for access to fixing fasteners or to facilitate fixing processes. Flat mirrored glass sheets 31 are bonded to the angled top faces. The top faces of the box section are designed to provide the appropriate angles for reflecting incoming-radiation that is parallel to the common axis, to the focus for concentrating the radiation.

As can best be seen in FIGS. 13 and 14, the angulation of the box sections 13 to the dish axis is achieved by the angle at which the flanges 23,24 are bent to the respective faces 22. Flanges 23, 24 are formed by folding the rectangular metal sheeting 20, and are angled to the channel member base 22. The angle through which the innermost flange 23 is folded is herein termed the bend angle. The outer flange 24 is folded parallel to flange 23. In the preferred arrangement, the bend angle changes from approximately 90 degrees at the hub to approximately 113 degrees at the outer rim member 12, and is unique for of the arcuate structural members 13.

The derivation of the bend angle is derived in the manner explained with reference to the geometry of FIG. 14 where the line AS is the axis of the dish through the focus, F, and is presented as a vertical line. The points S and F are fixed, the co ordinates of S dependent on the position relative to the hub of the inner flange of the arcuate structural member being considered and the co ordinates of F dependent on the preferred focusing properties of the dish.

When AB is aligned to a radiation source, the vertical line through P represents direct beam radiation to be reflected at P to intercept AB at F.

T, P and S are co-linear and P is the midpoint between T and S. A normal to ST through P intercepts AB at B. The distance between S and T is constant being the width of the base, 22, of the channel member, 20. A line through T, P and S intercepts AB at A.

The bend angle is derived by rotating ST about S, changing the direction of PB and PA and their intercepts on AB, until the length FA equals the length FB. The angle between ST and a horizontal intercept on ST is represented by the symbol gamma. The bend angle is 90 degrees plus gamma.

Figure 15:
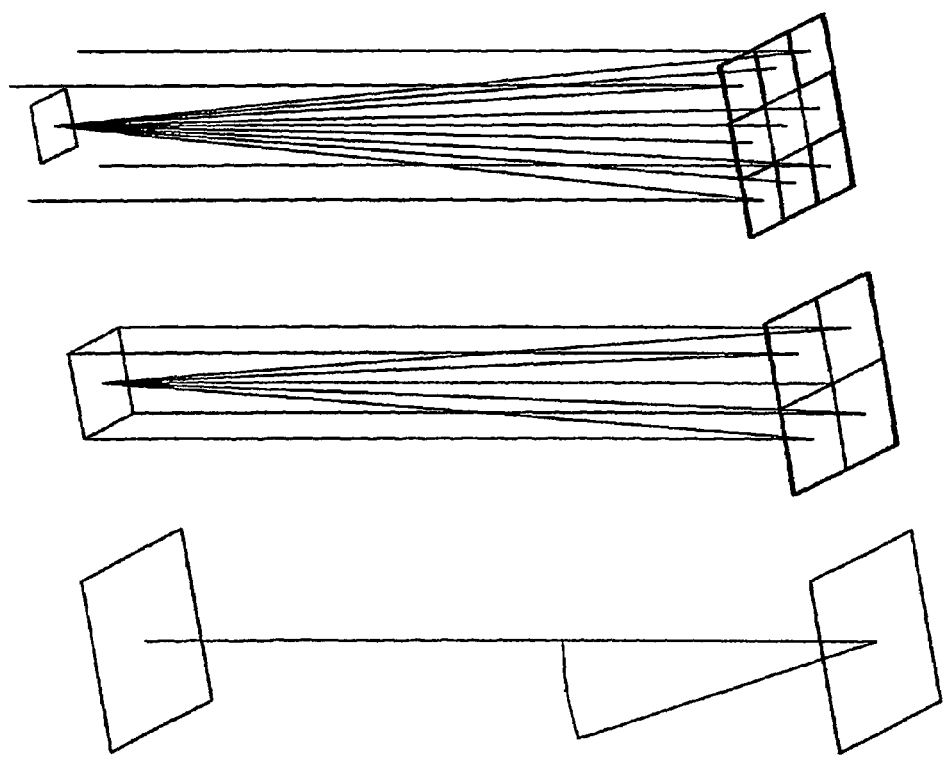
FIG. 15 illustrates a sub-faceting process for enhancing the concentration of the solar collection.

The top face may be deformed during the manufacture to produce a number of flats or facets appropriately angled relative to the single facet angle, such than when smaller flat mirrored glass sheets are attached, the concentration is increased. This is illustrated in FIG. 15.

The outer ring 12, the mirrored polygonal rings 13 and bracing plates 36 are assembled around the hollow cylindrical hub 11 and braced by rod spokes 48. The rings and hub have the same axis and one end of the hub is positioned approximately 1 metre from, and on the non-dish side of the plane of the outer ring intercept on the axis.

The hub is about 5 metres in length and 1 metre diameter, and is attached on its outside surface, about 1.5 metres from its end on the convex side of the dish, to one end of a radial strut 39, which may be regarded as constituting a torque tube. This tube is about 12 metres long and is sufficiently strong to adequately resist bending and twisting. The diameter of the hub and the axis of the torque tube are in alignment at their point of connection.

The torque tube is attached at its other end to the centre of a bearing tube, which is a cylindrical beam about 18 metres long. This forms a tee which is braced by struts connected each side to the approximate centre of the torque tube and the ends of the bearing tube. The axis of the torque tube is at right angles to the axis of the bearing tube and aligned with the bearing tube diameter.

The receiver 40 is configured to be rigidly suspended about the focus to intercept the concentrated radiation. The preferred support for the receiver is a central column attached to the hub, stabilized by guys 41 to the outer ring and aligned with the dish axis.

Figure 6:
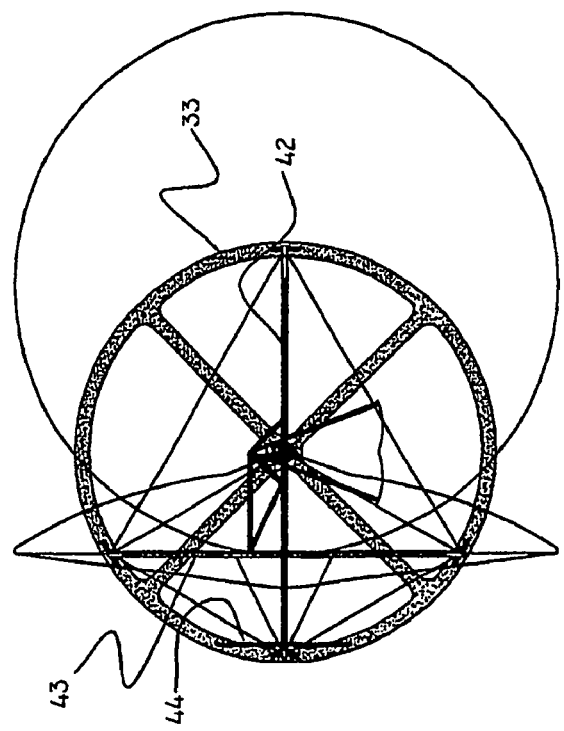
FIG. 6 is plan view showing the dish platform and illustrating in light relief the fully elevated and fully stowed dish positions.

The dish is connected to a base comprising a frame of structural "I" beams approximately 0.6 metres deep in the form of a cross in the horizontal plane. The major arm 42 of the cross is approximately 18 metres long and the minor arm 43 is approximately 15 metres long (see FIG. 6) and they are connected approximately 4 metres from one end of the major arm. Structural "I" beams 44 are approximately 0.25 metres deep and 3 metres long and constitute small arms which are attached on each side and parallel to the minor arm. Bracing rods are attached connecting adjacent ends of the cross and connections between midpoints of the adjacent arms of the cross. The major arm is modified to increase its torsional stiffness by attaching side plates to form parallel box sections in the length between the minor arm intersection and the end of the small arms. Horizontal axis bearings are attached at the ends and the centre of the minor arm.

The base carries has wheeled bogey assemblies 45 at its extremities and also has an azimuth pivot bearing 46 and vertical shaft about half way along its major arm. The bogies carry vertical down loads to the foundations and are aligned to follow a circular path and the pivot bearing carries horizontal and up and down vertical loads.

The elevation drive beam 32 is an "I" section curved beam, and is connected to one end of a vertical strut 47 forming a support post at an end of the curved beam. The other end of the support post is connected to the end of the major arm 42 of the base, nearer the minor arm 43. The remaining end of the elevation drive beam is connected at the other end of the major arm so that the plane of curvature is in the vertical plane above the major arm 42 of the base. The "I" section is approximately 0.8 metres deep in the plane of curvature, the radius of curvature for the neutral axis in the vertical plane is about 12 metres and the arc length is approximately a quarter of a circle. The upper end of the support post is braced by nods fixed to the ends of the small arms.

The reinforced concrete foundations 33 are of sufficient strength to carry the gravitational and aerodynamic loads, and comprise a horizontal ring approximately 18 metres in diameter forming a flat circular track for the bogey wheels. The wheels are tired with a high strength polymer suited to the transfer of the vertical down loads to the concrete. Radially directed structural reinforced concrete crossbeams connect the centre of the ring to the circular track foundation and, where they intersect, provide a mounting for the azimuth pivot bearing vertical shaft.

The three major elements ie dish, base and foundations are assembled to form a system that facilitates the rotation of the dish about vertical and horizontal axes. The dish is connected to the base by 3 sets of bearings and shafts in the bearing tube that are supported from the minor arm of the base on raised plumber blocks. The height of the blocks above the minor arm is sufficiently greater than the radius of the bearing tube to allow the bearing tube to rotate. The bearing tube is manufactured with an opening in the tube wall at the centre to allow the raised plumber block to align with the bearing tube axis. The angular displacement of approximately 90 degrees about the horizontal axis, is achieved by the actuation of a drive mechanism applying forces between the elevation drive beam attached to the base and the hub of the dish.

The angular displacement of the base and dish combination of +/−135 degrees about the vertical axis is achieved by the actuation of a drive mechanism applying forces between the base and the foundations. The preferred drive is by one of a pair of double acting hydraulic cylinders or rams with appropriate pumps, control valves and interconnections, applying force between mechanical connections on the fixed and moving element. An automated control process changes the drive between cylinders when the limit of extension or retraction is reached.

To rotate the base and dish supported on the wheeled bogies about the vertical axis, the two rams are attached to suitable pivots on the facing sides of the crossbeams and within one of the quadrants formed by the crossbeams. One ram connects to a drive pin on the base via a cam operated coupling in a configuration such that upon extension or retraction it applies a torque to the base, about the vertical axis.

The second of the two rams, when not in use, is maintained in its fully extended position and is connected to the drive pin via a cam operated coupling when the first ram approaches its full extension. The coupling is configured such that at least one ram is always connected and the first ram is disconnected as the second ram retracts. The transition occurs when both rams are at near full extension and takes place over approximately 15 degrees of rotation. The second ram, by extending or retracting, applies a torque to the base about the vertical axis.

The dish and base combination will rotate when the torque from either ram is sufficient to exceed the resisting torque generated by bearing friction, inertia and wind loads. Each ram is configured to have sufficient extension to rotate the dish and base combination through 135 degrees and transition between the rams takes place when the horizontal axis of the dish is orthogonal to the vertical north/south plane. If required, at full rotation, the driving ram can be disconnected by a manual operation and the dish rotated a further 45 degrees under an external drive.

The double ram arrangement is suited to regions in both hemispheres beyond the tropics where the rotation is by one pole. In tropical regions rotation about the vertical axis is required via both poles and the preferred option is for a single double acting hydraulic cylinder to drive a rack and spur gear combination at the hub, extending the range to plus and minus 270 degrees.

Figure 16:
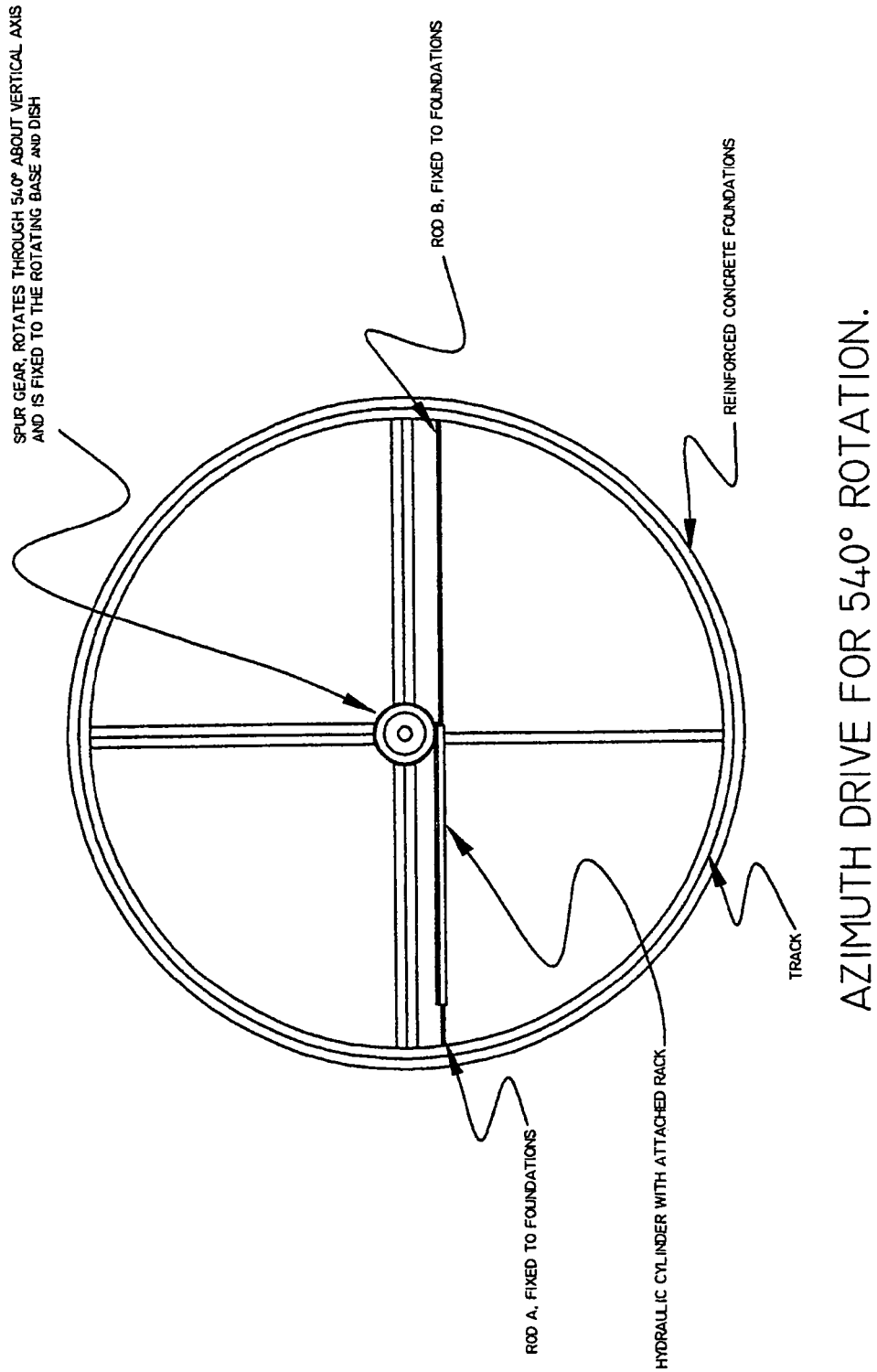
FIG. 16 is an annotated illustration of the dual ram arrangement of the azimuth drive for 540 degrees rotation.
Figure 17:
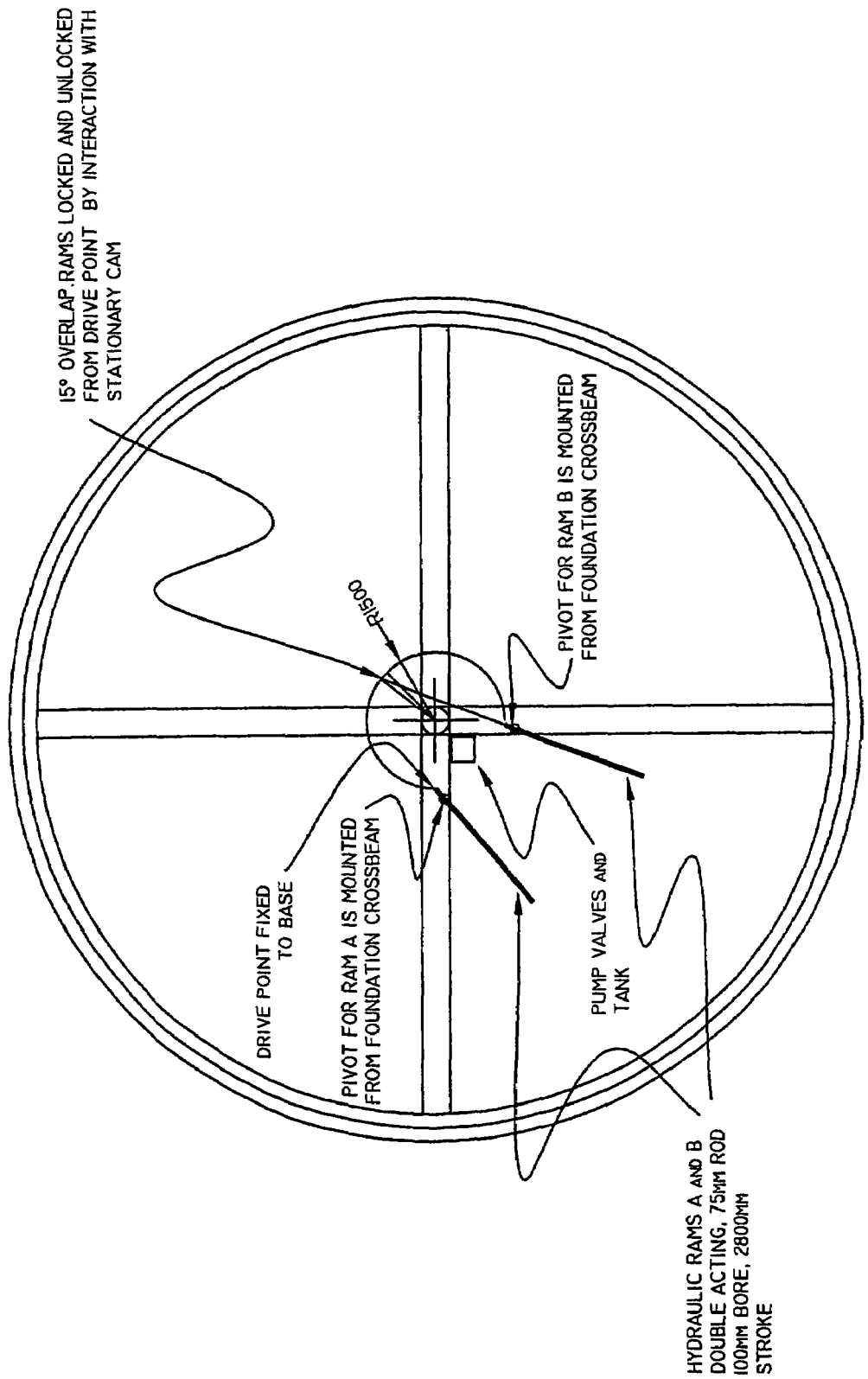
FIG. 17 is an annotated illustration of another arrangement of the dual ram of the azimuth drive.
Figure 18:
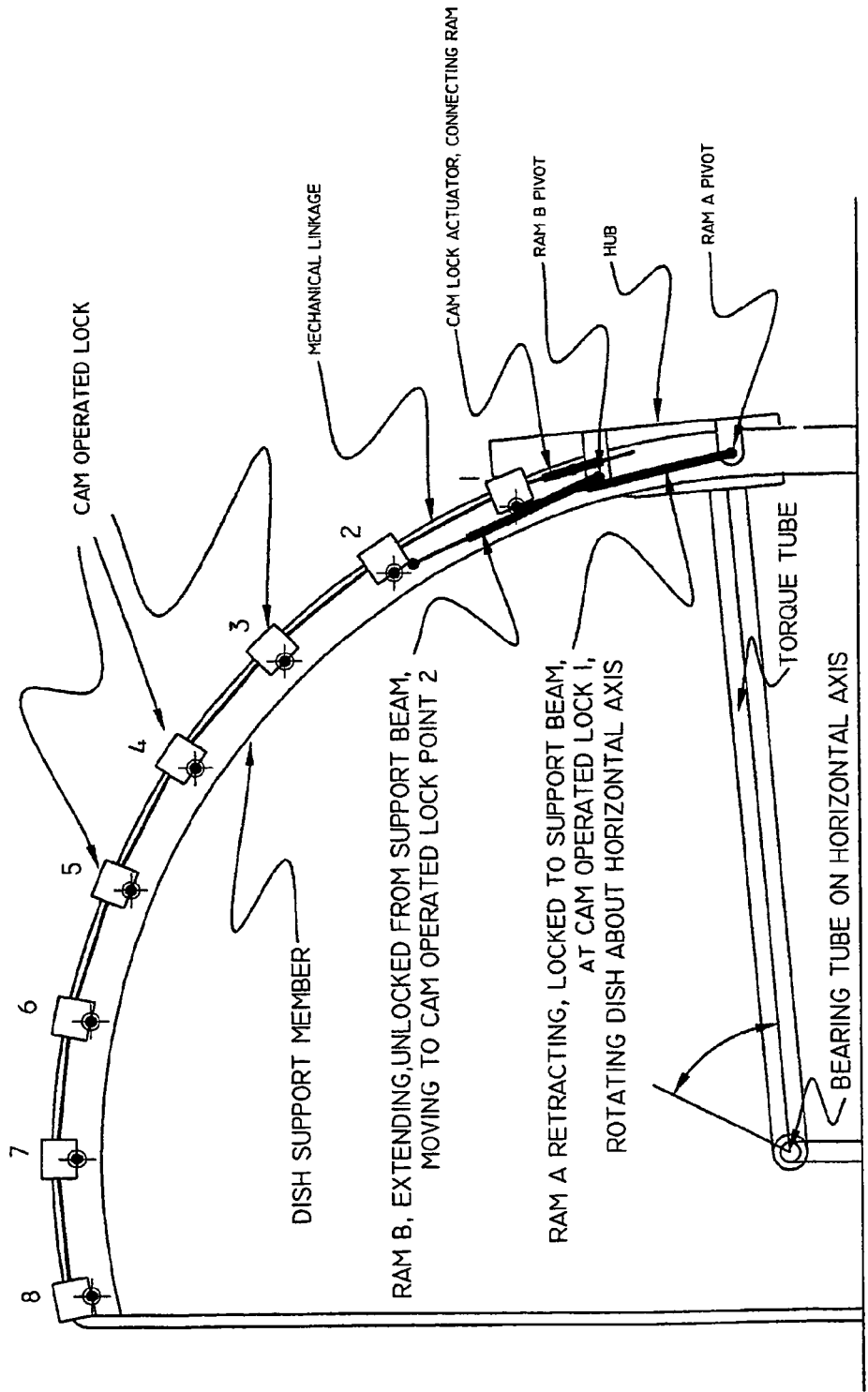
FIG. 18 is an annotated illustration of the dual ram arrangement for elevating the dish.
Figure 19:
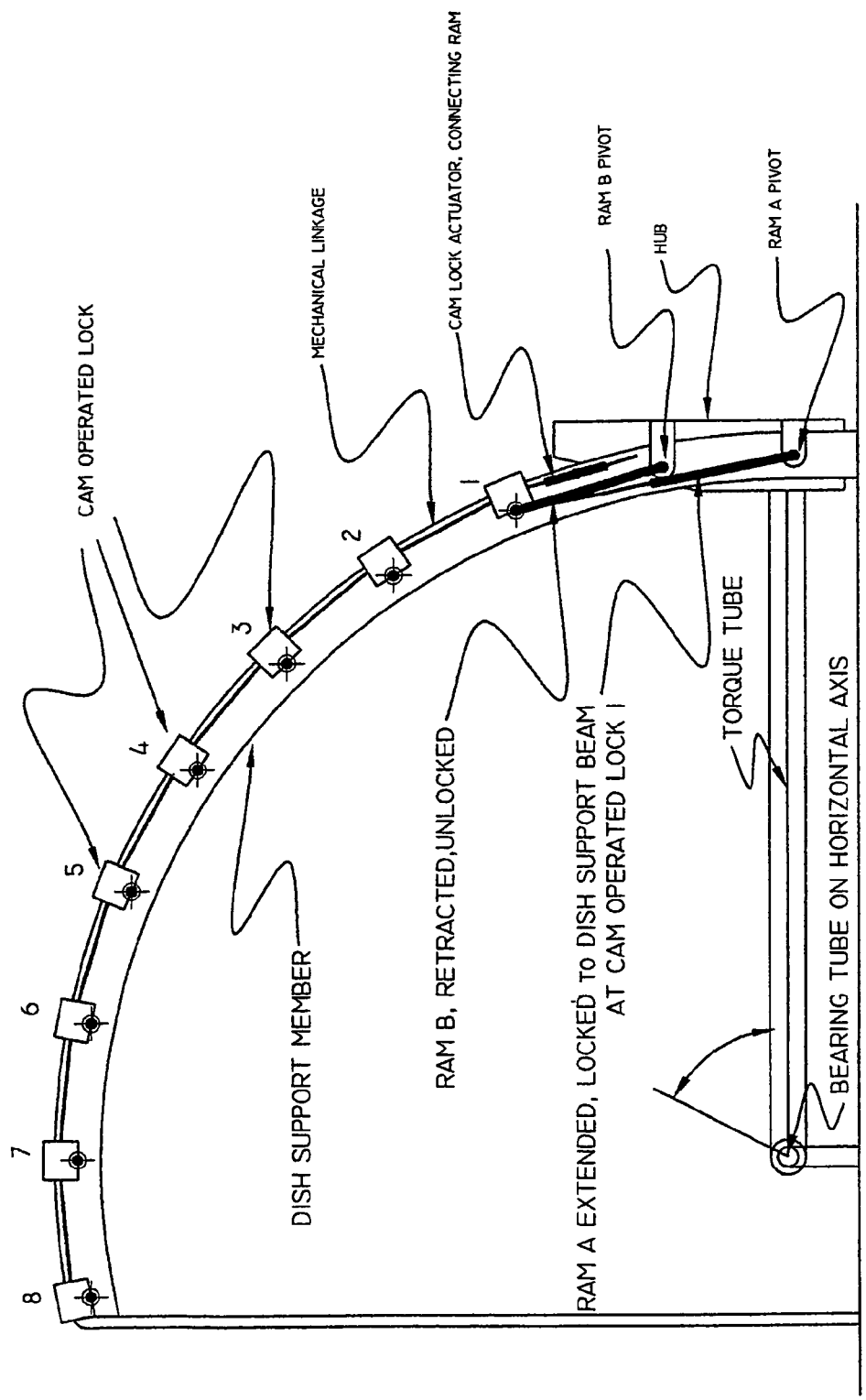
FIG. 19 is an annotated illustration of the dual ram arrangement for stowing the dish.

The hydraulic ram in this configuration (see FIG. 16), has an arrangement whereby the rod is fixed to the foundation and the cylinder, with rack attached, moves as fluid is displaced from one side of the piston to the other. The valve and pump arrangement is designed to minimise fluid inventory.

To rotate the dish supported on the bearing tube about the horizontal axis, the two rams are attached to suitable pivots within the hub. The rams operate alternatively, each four times, connecting and disconnecting from the elevation drive beam via hydraulic actuated cams or locks. The cams are configured such that at least one ram is always connected.

When the rams are identical, the volume displaced while extending one ram is identical to the volume required for retraction of the other ram at the same rate. The control system and valves compensate for small differences.

At the completion of a full extension or retraction, the unconnected ram is aligned with another connecting cam and is connected by a mechanism driven by the force of the connecting ram in the form of a small double acting hydraulic cylinder.

For illustrative purposes, annotated drawings as per FIGS. 16-19 describe the operation of the double acting ram in the various configuration of azimuth and elevational positioning of the dish.

Under the control of an electronic system, the driving rams on both axes extend or retract and appropriate cams engage or disengage, to rotate the dish and align the dish axis with the required direction. Preferably, the driving only takes place when an angular difference between the required direction and the dish axis is unacceptable. In a sun-tracking mode the acceptable difference is approximately 0.1 degree and the changeover of the ram drive within a pair is achieved before this difference is exceeded.

The tracking process can proceed through its full angular range, 90 degrees in elevation and +/−135 degrees in azimuth, for winds up to the design tracking-wind velocity. For wind velocities above the tracking velocity, the dish is stowed in its survival position, zero elevation, concave side up.

It will be appreciated that the dish is designed such that the mounting points for the mirrors are determined by the accuracy of the position of their polygonal ring. The process of nesting and fastening rings together, the inclusion of bracing plates and their bracing by spokes, the structural properties of a box section and the hoop strength of a ring, combine to maintain these mounting points in space to the required accuracy of the optical system. The mirror mounting faces are positioned to an approximate paraboloid and no adjustment is allowed for in the design.

All mirror pieces are squares of the same size. The mirror size determines the concentration with the smaller the square, the higher the concentration. For high concentration, sub-facets are pressed into the main face formed as part of the polygonal surface. The nested polygonal rings are manufactured on site from galvanized sheet steel, are braced by spokes to a hub, and form a quasi-continuous surface, approximating the shape of a paraboloid to carry mirrors. The shape is approximate because of the optics associated with flat facets requires discontinuities (semi fresnel) along a radial line on the surface. For higher concentration ratios, some degree of concavity may be produced by sub-faceting the polygonal face and subdividing the mirror into smaller yet still square pieces. The preferred concentration ratio for this design with flat mirrors is 1000:1 (as seen in FIG. 15). Ratios achieved while maintaining square glass mirrors, each of the same size but one quarter or one ninth of the original, are stepped, 1000:1, 4000:1 and 9000:1, e.g. panel as a flat, sub-faceted 2×2, sub-faceted 3×3.

The dish has a horizontal axis pivot tangential to the rim and in the plane of the dish centre normal to the dish axis and rotates in elevation about the horizontal axis by the application of a force at its centre and relies on the torque tube connection to the bearing tube to provide the counter to transverse out of balance wind forces.

The transfer of the gravitational and wind loads in the dish is in part via each polygonal ring sector terminating at the radial bracing plates that are rod braced to the hub by rods 48. The flanged box section intercept when attached to the bracing plate, reinforces the plate against local buckling. Additionally, each sector transfers to the next towards the centre, via the fin 29 on the inner polygonal vertical face 14. This fin 29 engages in the matching cavity 30 or groove on the outer polygonal vertical face 15 of the next ring.

The polygonal forming process produces internal tapered beams or ribs 21, top and bottom, in the box section and produces the vertical beams 49 on the inner surface 14 connected to the fin 29. When the fin 29 engages the groove 30 and is fastened to the groove, that same vertical beam 49 stabilises the outer face 15 that carries the groove 30 against buckling. The final coupling to the hub 11 is via a fabricated groove (not shown) comprising the space between two closely spaced rings to which the innermost polygonal section fin engages and is fastened. The design takes into account the summing effect of loads on all previous rings as the centre hub is approached and the added strength is provided by increased metal thickness for the inner rings. The depth of the internal beams increases with decrease in diameter of the rings and so increases the stiffness with increasing load.

The dish is assembled on-site on its base with the only prefabricated factory made components being the hub, torque tube, bearing tube and outer ring. The heaviest of these components is the torque tube 39 at 1.5 tonnes and can be placed in position with a medium size forklift. The bracing plates 36 are 150 KG, 6 mm thick, galvanized, sheet steel ribs that bolt to cleats on the hub 11 and brace to the top and bottom of the hub with solid steel rod spokes. The spokes are threaded at one end for tensioning. Apart from the attachment points of the spokes to the top of the hub all elements in the assembly are less than 3 metres above the base. This is a major advantage compared to the 7 to 10 metres of the comparative systems.

The polygonal box sections are formed on site from flat or coiled steel sheet that preferably has been prepared in a factory by prepunching and for flat sheet, preforming one edge by bending a small reference upturn of approximately 60 mm. With only one edge upturned flat sheets can be stacked compactly one on another for efficient transport if in flat sheet form, it is cut to length to match the range of polygonal sectors required. The prepunching produces appropriate cutouts that allow beams to form at the same time on adjacent but angled surfaces and to provide for access for the fastening devices that insert the fasteners to join nested rings.

Figure 13A:
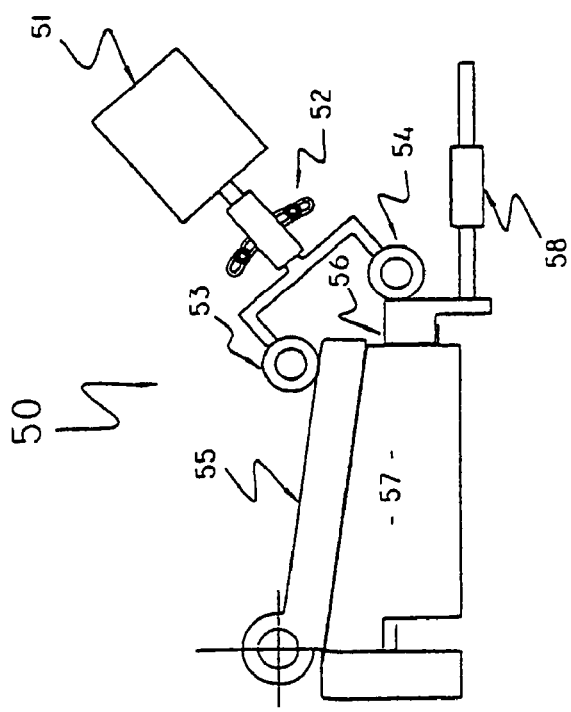
FIGS. 13A-13D are side views illustrating the operation by which the ribs are formed.
Figure 13B:
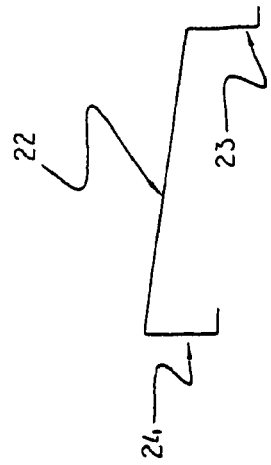
Figure 13C:
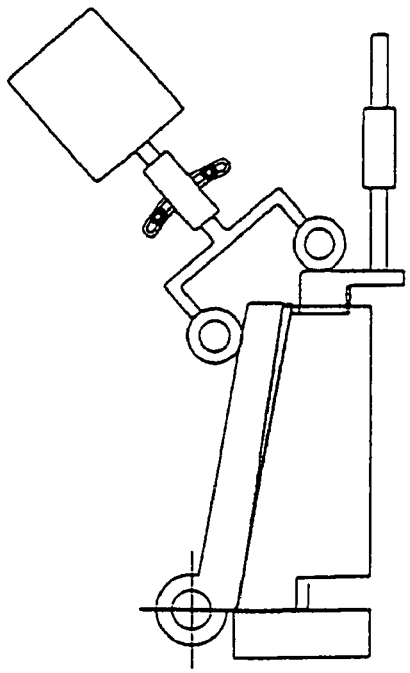

A specifically designed bending mechanism for forming an upper (18) and lower (19) part of the polygonal ring is illustrated in FIGS. 13A and 13C. The two parts or channels 18,19 which when fastened together form the box section 13, have flanged and punched ends formed as part of the process. The fastening together is preferably by double sided adhesive tape and is of sufficient strength to allow the sector to be handled, have the mirrored glass attached and transferred to the dish for attachment to the previously mounted ring and bracing plates. The final fastening of the two pieces is incorporated in the fastening of adjacent nested rings, where fins in grooves are joined together at regular intervals in a semiautomatic process.

Figure 13D:
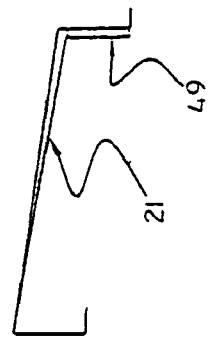

Turning to the illustrations of FIGS. 13A to 13D, it will be seen that tool 50 forms the ribs 21 and 49 thereby changing the cross-sectional profile of the upper or lower channel members from that seen in FIG. 13B, which corresponds to tool 50 being in the position shown in FIG. 13A to that seen in FIG. 13D which corresponds to tool 50 being in the position shown in FIG. 13C Tool 50 comprises a force applicator 51 which provides a force at an angle determined by the setting of angle adjuster 52 which is set to half the bend angle. The force is applied at the predetermined angle to a pair of coupled rollers 53,54 which respectively apply force to a first male die 55 and a second male die 56. Die 53 is pivoted at an upper point and engages with a female die 57 at an increasing depth away from the pivot point. Die 55 is adapted to move perpendicular to die 57 by the action of linear bearing 58 and engages therewith at a uniform depth. When a sheet 22 is placed between the upper male die set 55,56 and the female die 57, actuation of force applicator 51 causes rib 21 to be formed between dies 55 and 57 and rib 49 is formed between dies 56 and 57.

The attachment of the glass is preferably by an automatic process when a robot like device lifts glass squares from a stack and to the already prepared face. The preparation is for another robot like device to clean the surface and to apply adhesive, preferably of the iso-cyano-acrylate instant bonding type to the face in an appropriate pattern of dots. Because of the "instant" nature of the bonding process, long curing times are eliminated. The largest ring sector, complete with mirrors weighs less than 150 KG and can be handled by a small forklift.

The preferred sequence of assembly is to complete one sector then move the forming machine adjacent to the next sector and so continue around the dish. In this way two sets of scaffolds or platforms are located at adjacent bracing plates and only one set is moved each changeover.

It will thus also be appreciated that in use in accordance with a preferred embodiment of the present invention, a method of erecting at a remote location a dish assembly 10 having a central hub 11 and an outer rim member 12, involves transporting to the remote location a plurality of flat stacked substantially rectangular metal sheets 20 (or nested sections formed therefrom), at the remote location forming a plurality of arcuate structural members 13 of box-section configuration from the substantially rectangular metal sheets 20 or from the sections formed therefrom, and positioning the plurality of arcuate structural members 13 to extend concentrically from the central hub 11 to the outer rim member 12. The arcuate structural members 13 abut along their inner and outer arcuate surfaces 14,15 such that load can be transferred from an outer arcuate structural member to an adjoining inner arcuate structural member.

A plurality of radial support arms 36 are positioned extending from central hub 11 to outer rim member 12 and the radial support arms 36 support the arcuate structural members 13. The substantially rectangular metal sheets 20, or the sections formed therefrom, are formed into upper and lower channel members 18,19 which are joined to form the arcuate structural members 13. Transverse ribs 21 are formed across channel base 22 between channel flanges 23,24 within the channel by folding inwardly a portion of channel base 22, the told being deeper at one flange than the other such that the rib 21 formed thereby is correspondingly deeper at one flange than the other. The rib thus constitutes a cantilever and because the rib is formed from the channel base material, the edges of the substantially rectangular sheet 20 becomes angled about the rib to thereby form the arc in the arcuate member 13.

To elevate the dish assembly 10, a dish support member 32, which is mounted on rotating platform 35 on foundation 33, supports dish assembly 10 within an opening in hub member 11 which is adapted to cooperate with the dish support member 32 to elevate the dish assembly 10 with respect to the foundation 33.

The present invention in its various aspects and preferred embodiments provides a number of advantages over known dish assemblies where the limited number of dishes having an area in excess of 250 sq. meters have a number of disadvantages including:— costs which are too high for acceptable energy output costs.

aerodynamic loads which are not minimised.

actuation by means of hydraulic drives which are not optimised to minimise the onsite inventory of oil and which use complicated and costly ram recycling techniques.

use of reinforced concrete circular tracks as foundations which is unnecessarily expensive because of the exacting levelling requirements and the number of attachment points embedded.

To achieve the desired level of concentration, the mirrored glass in known systems is subjected to biaxial stresses or is heatformed to dual curvature before silvering. The mirror substrate is designed to have sufficient rigidity to span considerable distances between mounting points.

During installation of known dishes, large capacity cranes are required on site, to lift assembled or partly assembled dishes onto the base or axis of rotation pivots. Furthermore component dimensions and form of known systems are not optimised to container transport.

Existing large dish assemblies have large exo-skeletal configurations with large void, space frames or obtain their rigidity via substantial core beam and peripheral trusses. The major components are fabricated off site and depending on the location of the installation, require shipping, usually in containers. However the space frames are made from closed ended steel tubes of various diameters and have a poor mass to volume ratio. Similarly trusses are mainly void and present a poor mass to volume ratio. Transportation to on-site location of known systems is therefore inefficient.

The present invention in its various aspects and preferred embodiments has a dish which is lower in cost and features the integration of the mirror substrate into the structure. The major part of the dish may be manufactured on site, reducing costs of transport. The transported materials have a high mass to volume ratio. Large cylinders are open-ended and the internal volume is accessible to accommodate smaller items during transport.

The dish materials have corrosion resistant finish and post manufacture anti-corrosion treatment is not required. Only a brief time is required to assemble the dish because of the processes used. No resin casting processes with their associated setting and curing times are involved. Furthermore, the aerodynamic profile is enhanced because the dish stows nearer the ground plane than other designs. The structural requirements are therefore less demanding at the survival wind velocity.

The glass mirror panels are all the same size and remain flat and are not subjected to stresses associated with curvature. Their size and configuration of the flat mirrors are well suited to robotic pick up and place operations.

The design is flexible in that it allows high concentrations to be achieved by deforming the flat face to accept a number of smaller flat glass facets. The installation does not require large reach, high capacity cranes for the installation and the dish is assembled on the base.

The manufacturing plant is flexible and high cost items such as the polygon forming mechanisms, are adjustable to cover the range of sizes required.

Furthermore and in general, another reason for there being a limited number of dishes in excess of 250 sq. meters is the weight of such structures when made by conventional techniques. The present invention facilitates the construction of large area dishes which have a relatively light weight per unit area.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

The claims defining the invention are as follows:

1. A dish assembly including:

a central hub;

an outer rim member, and a plurality of concentric arcuate structural members comprising at least an inner and an outer arcuate structural members extending from the central hub to the outer rim member;

each of the arcuate structural members having an upper channel member, a lower channel member, an inner arcuate surface and an outer arcuate surface which cooperate to constitute a box section configuration, and wherein said each upper and lower channel member comprises a channel base and a pair of channel flanges; and the inner and outer arcuate surfaces of each of the arcuate structural members are abutted such that a gravitational or wind load is transferred from the outer arcuate structural member to the adjoining inner arcuate structural member via a fin disposed on the inner arcuate surface of each of the arcuate structural members.

2. The dish assembly as claimed in claim 1, and including a plurality of radial support arms extending from the central hub to the outer rim member and adapted to support the ends of the arcuate structural members.

3. The dish assembly as claimed in claim 1, wherein the upper and lower channel members are formed from substantially rectangular metal sheeting.

4. The dish assembly as claimed in claim 3, wherein the gauge of the metal sheeting of each inner arcuate structural member is greater the gauge of each outer arcuate structural member.

5. The dish assembly as claimed in claim 4, wherein the upper and lower channel members have a transverse rib formed within the upper and lower channel members across the channel base between the channel flanges, the rib being formed from the base.

6. The dish assembly as claimed in claim 5, wherein the rib is formed by folding inwardly a portion of the base, the inwardly folded portion of the base being deeper at one flange than the other such that the rib is correspondingly deeper at one flange than at the other flange, whereby the rib constitutes a cantilever and whereby the edges of the substantially rectangular sheeting becomes angled about the rib to thereby form an arc in the arcuate member.

7. The dish assembly as claimed in claim 1, wherein the said channel flanges of the upper and lower channel members have outwardly and inwardly directed returns at the respective bases thereof, such that when the upper and lower channel members cooperate to constitute the arcuate structural member of box section configuration, the returns constitute cooperating keys and recesses respectively of adjoining concentric arcuate structural members whereby said wind load is transferred from the outer arcuate structural member to the adjoining inner arcuate structural member.

8. The dish assembly as claimed in claim 1, and including a plurality of mirrors affixed to the bases of the upper channel members whereby the dish assembly constitutes a solar collector.

9. The dish assembly as claimed in claim 8, wherein the glass mirrors are substantially square with sides substantially the width of the arcuate structural members.

10. The dish assembly as claimed in claim 1, and including a dish support member supportable on a foundation and receivable within an opening in the hub member and adapted to cooperate therewith to elevate the dish assembly with respect to the foundation.

* * * * *